United States Patent
Godfrey et al.

(10) Patent No.: US 6,363,479 B1
(45) Date of Patent: Mar. 26, 2002

(54) SYSTEM AND METHOD FOR SIGNING MARKUP LANGUAGE DATA

(75) Inventors: James A. Godfrey, Nepean; Kevin T. Simzer, Gloucester; Gordon W. Coulson, Ottawa, all of (CA)

(73) Assignee: Entrust Technologies Limited, Ontario (CA)

(*) Notice: Subject to any disclaimer, the term of this patent is extended or adjusted under 35 U.S.C. 154(b) by 0 days.

(21) Appl. No.: 09/120,715

(22) Filed: Jul. 22, 1998

(51) Int. Cl.[7] .................................................. G06F 1/24
(52) U.S. Cl. ........................ 713/160; 713/161; 713/170; 380/28; 380/37
(58) Field of Search ..................... 380/37, 28; 705/67; 713/160, 161, 170, 176

(56) References Cited

U.S. PATENT DOCUMENTS

| | | | |
|---|---|---|---|
| 4,458,109 A | * 7/1984 | Mueller-Schloer | 380/30 |
| 5,553,145 A | * 9/1996 | Micali | 380/30 |
| 5,557,518 A | * 9/1996 | Rosen | 705/69 |
| 5,703,949 A | * 12/1997 | Rosen | 705/65 |
| 6,073,242 A | * 6/2000 | Hardy et al. | 713/201 |
| 6,105,072 A | * 8/2000 | Fischer | 709/315 |
| 6,145,084 A | * 11/2000 | Zuili et al. | 713/201 |

OTHER PUBLICATIONS

ITU–T, F.400/X.400—Message handling system and service overview, Jul. 1996, International Telecommunication Union.*
ISPortal, Putting the Internet to Work for Private WANs, 1998, Compatible Systems.*
Kent et al., RFC 2402—IP Authentication Header, Nov. 1998, The Internet Society.*

* cited by examiner

*Primary Examiner*—Thomas R. Peeso

(57) ABSTRACT

A system and apparatus facilitates digital signing of data communicated between a first unit and a second unit through an interface independent proxy, or multiple independent proxies, interposed between the first and second units. The independent proxy has a digital signature initiation data detector to detect embedded signature initiation data in data to be signed. The independent proxy contains a signature generator through which the form based communication data flows. Initiation data is used in the communication data to automatically trigger the intermediary or independent proxy to sign the communication data. The signature generated by the intermediary is a persistent signature which is preserved in memory so that later verification can be performed once a transaction has been completed.

22 Claims, 4 Drawing Sheets

SYSTEM AND METHOD FOR SIGNING MARKUP LANGUAGE DATA

BACKGROUND OF THE INVENTION

The invention relates generally to systems and methods that employ digital signatures and more particularly to systems and methods that initiate generation of a digital signature, such as digital signatures for forms or other non text based information.

Many of today's communication systems, such as computer networks, telecommunication systems and other systems are increasingly employing digital signature technology to allow units that are communicating within the system to digitally sign data so that a receiver can verify that the data was in fact sent by a sender purporting to be the originator. One well known type of system is a public/private key system that incorporates a digital signature key pair as known in the art. In such systems, a public signature key is known to any participants in the community, and a secret private digital signature key is assigned to each subscriber, such as a software application, a computer terminal, or other entity. Industry standards have developed for electronic mail (e-mail) servers that route e-mails, through a store and forward manner, among members of the communication system community. Such store and forward based communication typically uses for example, a MIME format, as known in the art. In such systems, a user must typically initiate a digital signature process. As such, when text data is sent by an e-mail server or by an originator, the user must manually request and add a digital signature to the information which may then be communicated to another communication unit for verification.

However, increasingly, transactions requiring interactive, generally real time, bi-directional communication, including text and non text information need to be facilitated over worldwide networks and intra-networks, such as systems that employ the use of markup language data. For example, a common markup language used on the Internet is the hypertext markup language (HTML) which is a format used to digitally describe just about everything in the document that is not content. This is sometimes referred to as form data. With conventional markup language servers, such as WEB servers, a browser program or other interfaces do not generally include digital signature engines for interactive communications using for example, markup language based data. Typically when a system does include a digital signature engine of some sort, each interface manufacturer typically has its own format for an inclusion of a transaction based digital signature. However, there is no standardized methodology for utilizing digital signatures with form data. For example a conventional web server typically needs to maintain a set of digital signature request forms for different types of browsers if a single server needs to communicate with multiple different units within a community not containing the same browser. Although systems are known to have form or markup language based digital signature capability, the requirement of maintaining multiple signature request forms for each different type of browser can unnecessarily increase the overhead of a browser or web server. Also, it would be desirable to have a system and method that allowed the facility to incorporate form based digital signature communication with browsers or interfaces that do not have digital signature engines. As different web server formats are developed, and as communication systems grow with users having different types of browsers or browsers with no digital signature capabilities, it would desirable to allow non-repudiation of information to be independent to the type of browser or interface used by a subscriber or software application.

Another problem arises with use of different web browsers having different digital signature programs, since depending upon the type of digital signature algorithm, different web browsers may use different formats for the digital signature key string. A web server receiving this information typically has capabilities for only one or several types of digital signature generators, so that they are limited in the type and number of browsers that they can communicate with. Hence when a web server interfaces with different browsers, a web server needs to send different HTML forms to each browser to let the digital signature generator of the browser know what digital signature format is being used in the transaction. Hence when formats of digital signatures vary among different interfaces to the communication system, it becomes difficult to facilitate communication with new subscribers or existing subscribers with differing markup language data digital signature engines.

Some browsers are known which include an integrated digital signature generator for form based data that utilizes signature initiation data embedded in a subset of data to be signed. The digital signature generator is integrated in the sense that the signature generator uses the same address space as the browser. In one such system, a persistent digital signature is generated so that verification of a signor may be performed after a transaction has occurred However, such systems typically only sign a portion or subset of the data to be signed. As such, these systems do not generally provide an accurate record of what the user actually agreed upon. Such systems are typically dedicated to a particular type of web server or a particular type of browser. Therefore an increase in cost and processing overhead occurs when a web server must interface with browsers having differing digital signature engines. A digital signature plug in for each different type of browser may typically be required.

Also, as is known in the art, proxies are typically used in communication systems for transferring data, such as markup language data between a web server for example and a plurality of browsers. For example, a web proxy is typically a program on a server that redirects information and may provide such capabilities such as caching of information, and authentication of signatures. The proxies generally serve as an intermediate protocol handle. By way of example, an HTTP proxy looks at every header in a form to determine what packets are directed to which proxy address.

Also, it is conventional to have digital signature engines in each proxy to allow the digital signing of information that is sent during each data unit transfer session for determining whether information was corrupted during the transfer. For example a single transaction may require communication of multiple data units of information. The length of a data unit may be set by way of an industry standard such as in the case of the Internet. However any suitable data unit length may be used. The digital signatures for each data unit are discarded upon completion of a transaction and it can take multiple data units to get one form communicated. The data unit digital signatures are generated by the proxies to ensure that information was not modified during transmission. The digital signatures are stripped off below the application level so there is no digital signature on the form (e.g., HTTP form) when it is used by an application for example. In conventional systems employing digital signatures during data unit communication, the digital signature is applied by a server proxy for example so that a browser proxy may receive the signed data and verify the integrity of the data. These digital signatures are then discarded prior to the data being sent to the application or browser requesting the information. As such, data unit digital signature engines are used to ensure that data unit information can be checked for integrity. However, subsequent authentication of the information for the entire transaction is typically not used. As such, there exists a need for a markup language data based system that facilitates improved non-repudiation by utilizing transaction based digital signature methods for markup language based communications.

DETAILED DESCRIPTION OF THE INVENTION

Figure 1:
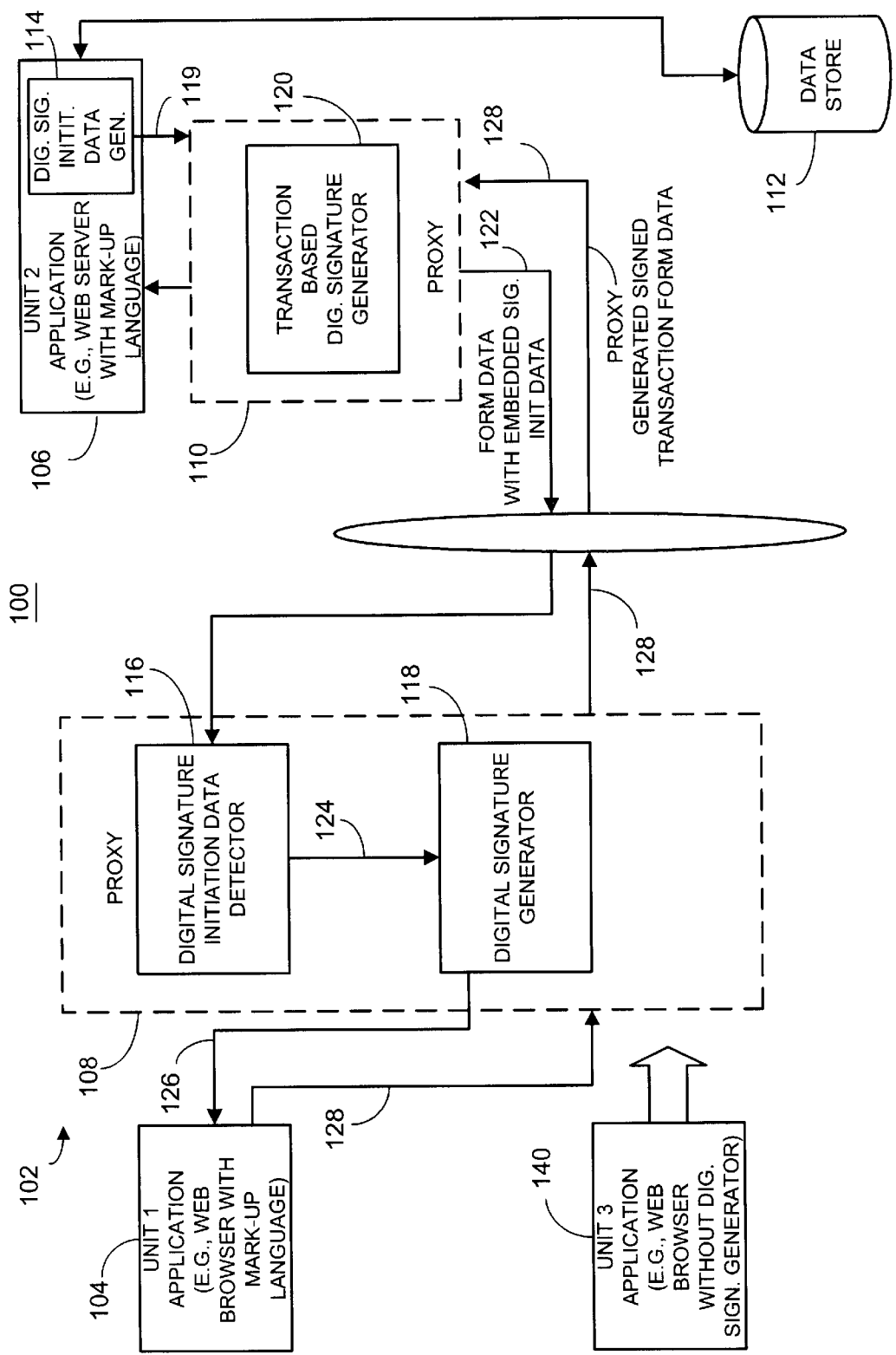
FIG. 1 is a block diagram illustrating one embodiment of a digital signing apparatus employing an independent proxy that detects digital signature initiation data in accordance with one embodiment of the invention.

A system and apparatus facilitates digital signing of data communicated between a first unit and a second unit through an independent proxy, or multiple proxies, interposed between the first and second units. The independent proxy has a digital signature initiation data detector to detect embedded signature initiation data in data to be signed. As such, the invention includes, among other things, an intermediary, such as a independent proxy that contains a signature generator through which the form based communication data flows. Initiation data is used in the communication data to automatically trigger the intermediary or independent proxy to sign the communication data. The signature generated by the intermediary is a persistent signature which is preserved in memory so that later verification can be performed once a transaction has been completed.

For example, the data to be signed may include markup language based data to allow digital signature of form data among for example a server and multiple units having different browsers. The independent proxy is interface (e.g., browser) independent and can facilitate digital signature application to browsers or programs not containing a digital signature generator. The independent proxy includes a digital signature generator that is coupled to the digital signature initiation data detector so that the digital signature generator generates a digital signature for the data, when the independent proxy detected embedded digital signature initiation data triggers the digital signature generator to generate a digital signature for the information passing through the independent proxy. The apparatus also includes memory that stores the proxy generated digital signature to facilitate signature verification after completion of the data transfer or after a transaction occurs between the first and second unit. The memory may be, for example, part of a server that stores the transaction based digital signature generated by the independent proxy on the form data to later verify the signature.

In one embodiment the apparatus includes a digital signature initiation data generator to generate the initiation data as part of a header tag. The digital signature initiation data generator is responsive to digital signature request data, such as data being generated by a user interface indicating that a user wishes to utilize a digital signature for the form data in a transaction.

In another embodiment, a second independent proxy is used, and a first independent proxy is associated with, for example a web server, and the second independent proxy is associated with for example browsers or other interfaces that communicate or receive form based data. In addition to performing the standard data unit based digital signature operation, each of the proxies includes a digital signature engine for applying a transaction based digital signature to facilitate non-repudiation of form data. These proxies may for example be protocol proxies that interface with a plurality of software programs that support a markup language to facilitate secure communication of markup language based information among the communication units.

FIG. 1 is a block diagram showing a communication system 100 having a digital signing apparatus 102. The communication system has a first unit 104, such as a software application, web browser on a network computer node, or other entity and a second unit 106, such as a software application, a web server, or other entity that communicates data, such as markup language based form data with the first unit 104. Such a system may be used, for example, to transact business or other activities over a worldwide network or intra-network. The digital signing apparatus 102 includes a first independent proxy 108 corresponding to the first unit 104, a second independent proxy 110 associated with the second unit 106, and memory 112 that contains proxy generated digital signature to facilitate signature verification after completion of a data transfer between the first unit 104 and the second unit 106. The first and second proxies 108 and 110 may be protocol proxies that effectively translate markup language based form data, such as HTML based data, to suitable information for analysis by the units 104 and 106 respectively. However it will be recognized that any suitable type of proxy may also be used. The protocol proxies 108 and 110 are preferably independent of the units 104 and 106 to facilitate a type of universal interface so that the units may be used with any suitable web browser which either contains digital signature capability or other application which fails to include digital signature capability. The proxies are independent in the sense that they operate outside of the control of the unit to which they interface. For example, the proxies may execute in a different address space from the units 104 and 106.

The second unit 106 includes a markup language data digital signature initiation data generator 114 that generates initiation data to be embedded with form data. The initiation data may be in the form of an HTTP header tag.

The first independent protocol proxy 108 includes a digital signature initiation data detector 116 that detects the embedded digital signature initiation data generated by data generator 114. The protocol proxy 108 also includes a transaction digital signature generator 118 which generates a digital signature for the first unit 104 in response to detecting the digital signature initiation data in the HTTP tag header. Hence the digital signature initiation data detector 116 initiates generation of a digital signature for the form data to be signed, in response to proxy detected embedded digital signature initiation data. The unit 106 generates markup language data 119 that includes embedded transaction initialization data along with form data to the independent proxy 110. The independent proxy 110 then applies a digital signature and sends this information out as form data with embedded digital initiation data 122.

The second independent proxy 110 also includes a transaction based digital signature generator 120 which applies a digital signature associated with the second unit to form data communicated between the units 104 and 106. The independent proxy 110 receives the entire form as form data and signs a subset of the entire data that is sent by the web server, to provide some level of transaction integrity. In this way, if an attacker modifies a document at unit 104, it can be detected. However, it will be recognized that the entire form data may also be signed if desired.

The unit 106 communicates the data with the digital signature initiation data through independent proxy 110. The other independent proxy 108 receives the data with the embedded digital signature initiation data and performs the initiating of the generation of the digital signature corresponding to the unit 104 to facilitate non-repudiation of data received from unit 104. The protocol proxy 108 detects the embedded digital signature initiation data (FIG. 2, 204) in form data 122 as generated by the digital signature initiation data generator 114. The signed form data 126 is sent to the unit 104 for processing. The unit 104 may then send returned form data 128 to the protocol proxy 108. The protocol proxy 108 then performs standard address translation, encryption and any other suitable processes to the returned form data and communicates the data to the independent proxy 110.

Hence, based on the detection of the digital signature initiation data, the digital signature initiation data detector 116 initiates generation of a digital signature through control signal 124 to the digital signature generator 118. The protocol proxy 108 digitally signs form data in response to the proxy detected embedded digital signature initiation data. The digital signature applied by the digital signature generator 118 serves as a transaction based digital signature as opposed to a data unit signature which is typically removed after completion of a data unit transfer session. The independent proxy 110 then performs verification of the digital signature that it had applied prior to sending the form data to unit 104 to confirm that the sent information was not modified by the unit 104. The transaction based digital signature is a persistent signature which is typically stored in memory 112 by the unit 106. Alternatively, the independent proxy 110 may store the persistent digital signature in memory 112. The digital signature data and corresponding returned form data is then sent to the application or unit 106. Unit 106 then stores the combination of the returned form data and associated digital signature in memory 112 to facilitate non-repudiation of data received.

The protocol proxies 108 and 110 may interface with a plurality of software programs. For example, independent proxy 110 may interface with a web server program whereas independent proxy 108 may interface with a browser based software program that supports a markup language application. The protocol proxies facilitate secure communication of markup language based information between the units 104 and 106. Also as shown, a third unit 140 is a software program or other unit that supports a markup language that fails to include a digital signature engine. The protocol proxy 108 applies a digital signature to transaction data associated with unit tree, 140, to facilitate secure communication of markup language based information between units not having digital signature engine capability. As such, the system shown in FIG. 1 can facilitate universal communication among units where for example, units 104 and 140 have different types of form based data digital signature engines or fail to include any digital signature engines.

Figure 2:
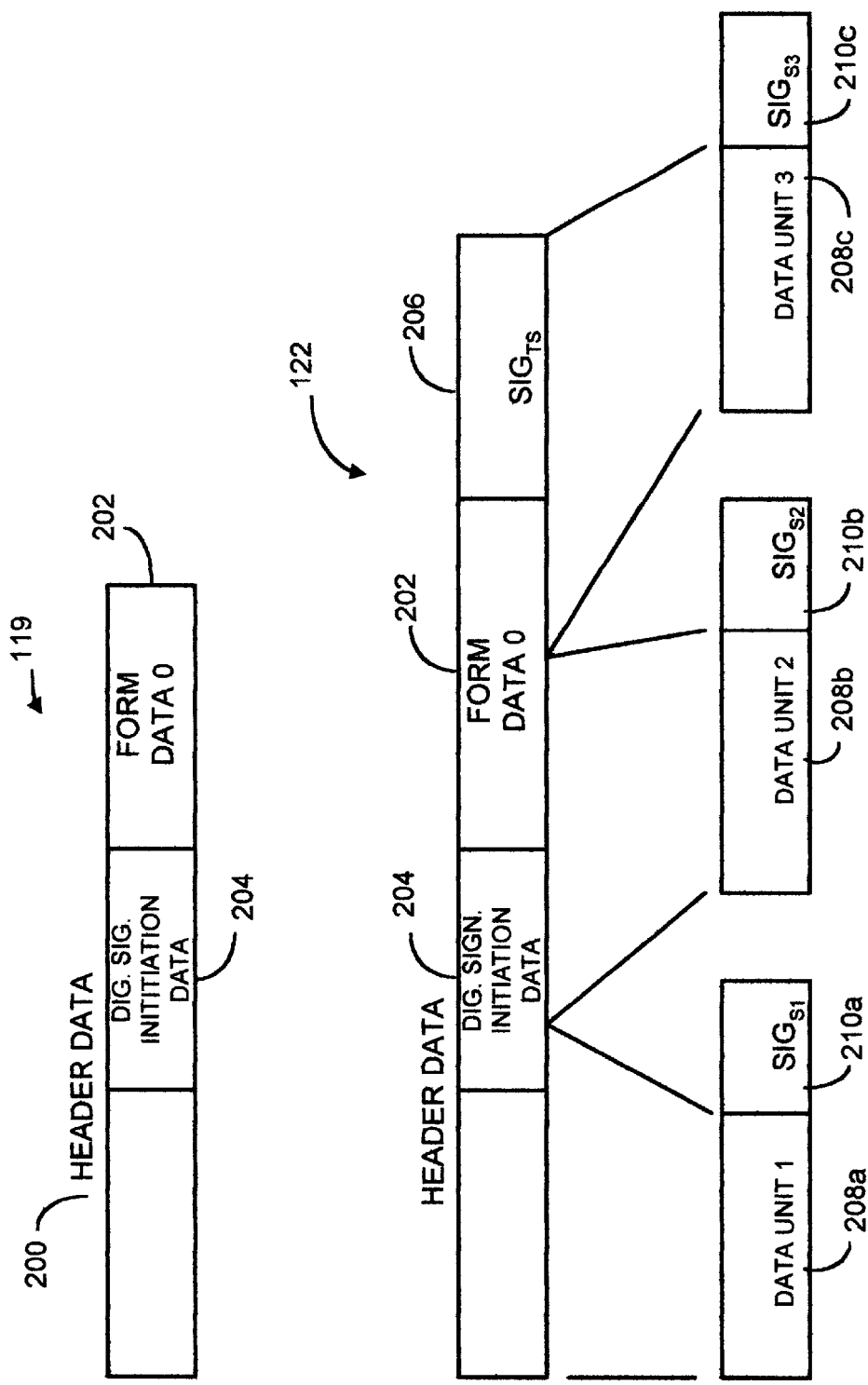
FIG. 2 is a graphic illustration of data format in accordance with one embodiment of the invention.

FIG. 2 shows by way of example, markup language data 119 in the form of HTTP header data 200 having form data 202 embedded with digital signature initiation data 204. The markup language data 119 is then signed by independent proxy 110 with transaction digital signature data 206. This digitally signed form data with embedded digital signature initiation data is the data 122 received by independent proxy 108. As known in the art, proxies such as protocol proxy 108 and protocol proxy 110 will communicate in data units by generating data units 208a, 208b and 208c from transaction data 122. Each group of data unit form data is digitally signed by a data unit digital signature generator in each of the protocol proxies 108 and 110. This data unit digital signature data is shown as data 210a through 210c. This digital signature information, as known in the art, is used to help ensure that the information during a data unit transfer session transmission can be verified. However the proxies discard the data unit signature data 210a–210c prior to transferring the information to units 104 and 106 respectively. As shown, the transaction based digital signature data 206 is sent as part of a data unit which again gets signed with a data unit digital signature as known in the art.

As also shown in FIG. 2, the independent proxy 108 and 110 apply multiple data unit digital signatures 210a–210c to data associated with each data unit transfer session between the first and second units 104 and 106. The multiple data unit transfer sessions correspond to a single transaction. The proxies remove the data unit digital signatures 210a–210c prior to joining data units into the transaction data by the application. Each of the proxies 108 and 110 apply the data unit digital signatures to data units and each apply digital signatures to transaction data.

Figure 3:
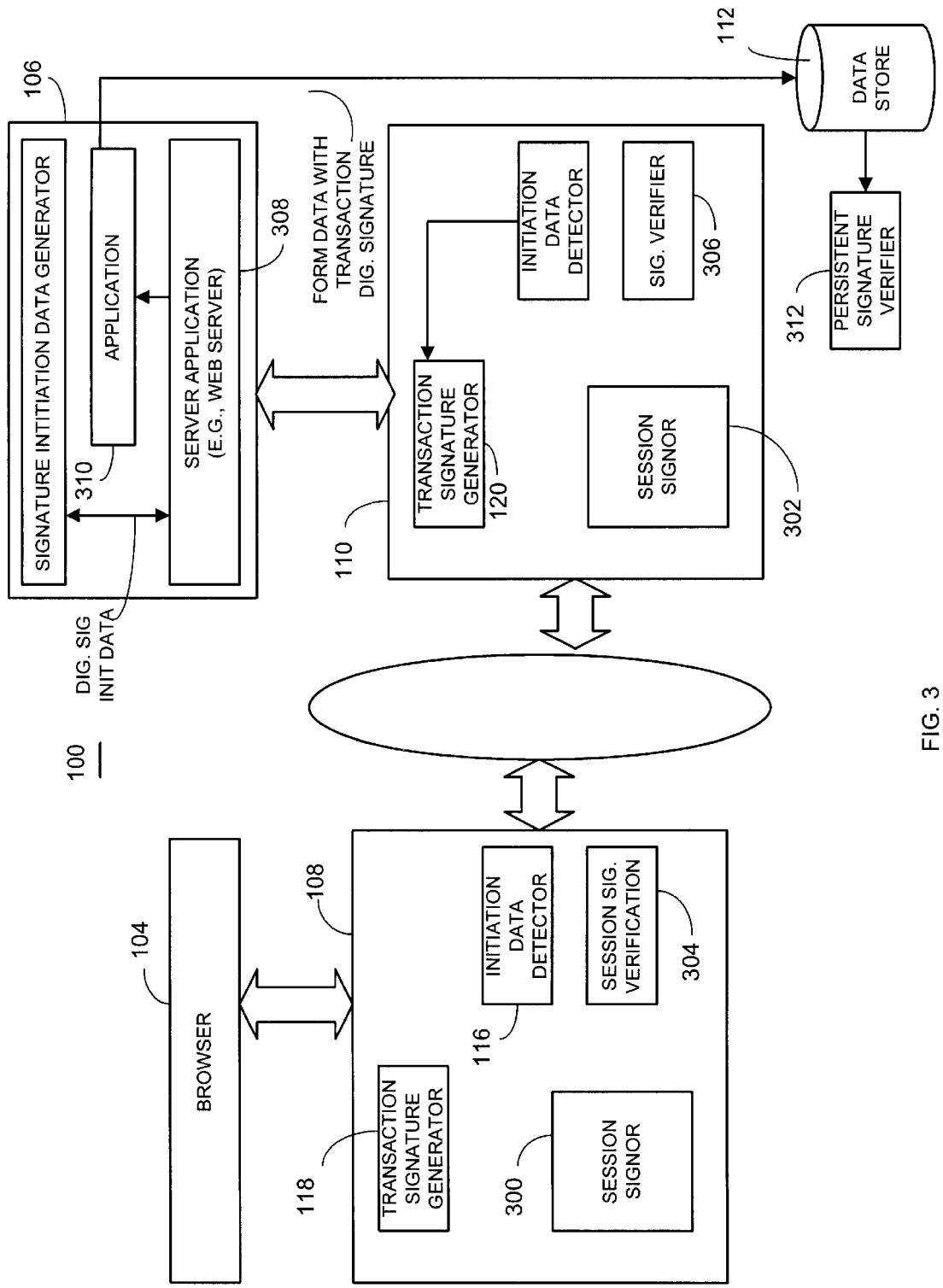
FIG. 3 is a block diagram illustrating a system utilizing a digital signature initiation data generator and independent proxy that detects digital signature initiation data in accordance with one embodiment of the invention.

Referring to FIG. 3, a more detailed block diagram of the system 100 shows the protocol proxies 108 and 110 each including data unit digital signature generators 300, 302 and corresponding data unit signature verifiers 304 and 306 respectively. The data unit digital signature generators 300 and 302 may be the same signature generators as the transaction digital signature generators 118 and 120, if desired. As shown in this embodiment, the unit 104 may be, for example, a browser program on a network node and the unit 106 may include a web server program 308 and a main application program 310, such as a bank transaction program. In addition, non-repudiation is enhanced by a transaction based signature verifier 312. The verifier 312 may output verified signatures from previous transactions and may use any suitable digital signature verifying process. When verifying a transaction in the future, the corresponding signatures may be extracted by the verifier 312 from the signatures stored in memory 112.

Figure 4:
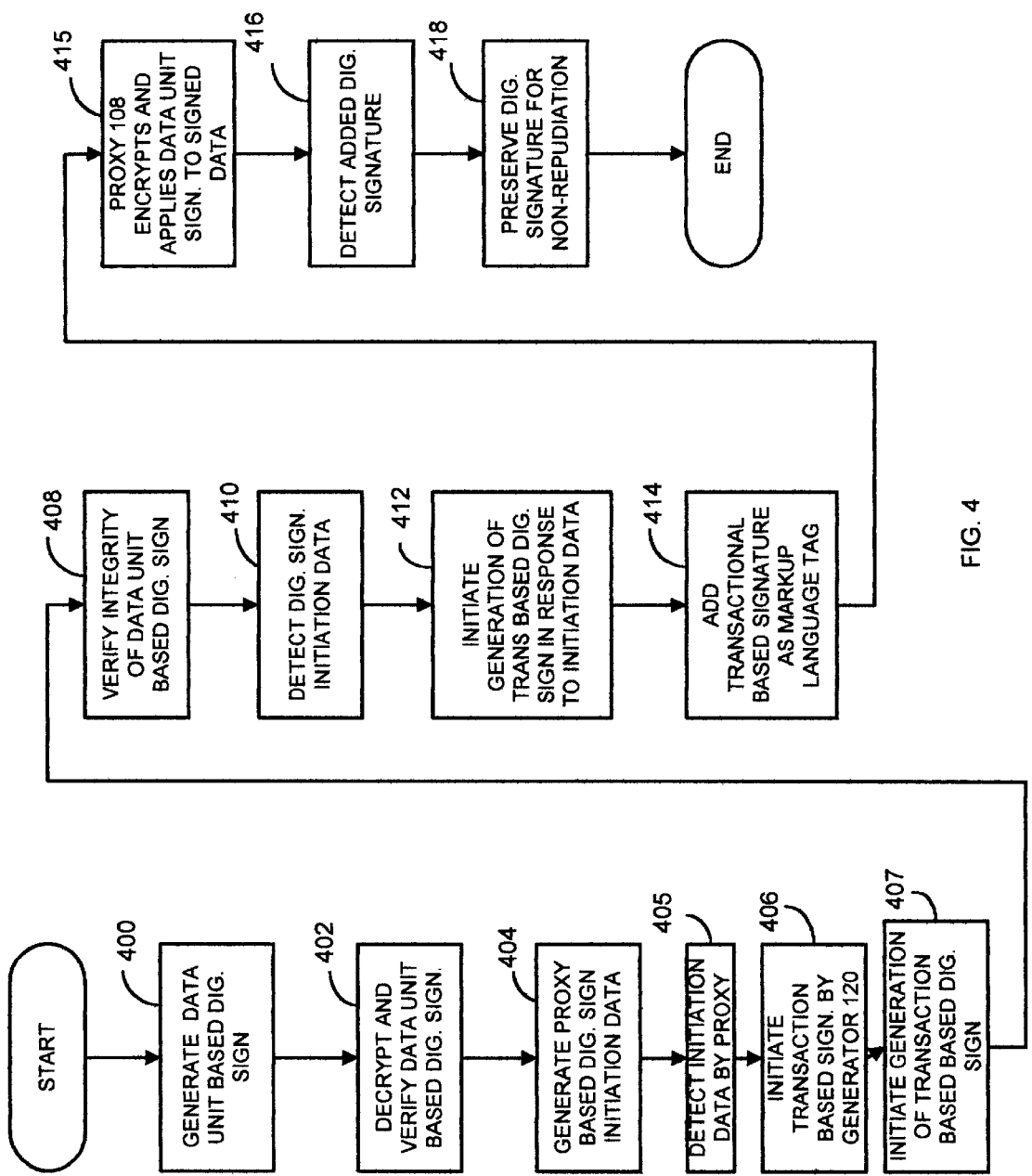
FIG. 4 is a flowchart illustrating the operation of the system of FIG. 3.

FIG. 4 shows the operation of the system 100 shown in FIG. 3. Digital signature support is provided for markup language based data such as form data including HTML forms. The user may identify which form will be signed using a special header value to define the digital signature initiation data, such as HTTP header tag data generated by the digital signature initiation data generator. As used herein, the words "header tag data" is not limited to data at the beginning of a packet, but includes data located anywhere in a data stream. Once signed by the designated proxy, the signature is added into the form data as a hidden input field. This allows the signature to be returned from, for example, a web browser to a web server where the signature can beverified. Generally, two persistent (transaction based) signatures are generated by the proxies as the form data to be signed is passed through the proxies. The server proxy 110 generates a signature which is used to ensure the integrity of the data submitted from the unit 106 and a digital signature is generated by proxy 108 to allow for non-repudiation of the transaction.

In operation, a user may navigate to a particular form and fill the form in and submit the results to the unit 106. As shown in block 400, the proxy 108 generates a data unit digital signature for initial markup language data (form data) and encrypts all the information using, for example, public/private key encryption techniques. This information is communicated to the other proxy 110. As shown in block 402, the server proxy 110 decrypts and verifies the data unit digital signature applied by the first proxy 108 and passes the results to the unit 106. The unit 106 generates a confirmation form (returned form data) to the user if the verification is successful. The user can then review the data and submit the request to the end processing system such as a banking transaction system. The unit 106 generates the digital signature transaction based embedded initiation data using the digital signature initiation data generator 114. Both proxies use data to trigger specific actions such as generating the digital signature as the form information traverses back between the units.

Preferably, although not required, the format for the embedded initiation data may be a form tag/value data pairs separated with a character, such as an ampersand. Such a format may match the data returned by an HTTP POST command, thus making it easier to verify the signature without any additional processing. This also improves performance of the proxy 110 since it does not have to parse the data items from the HTML data in order to sign them. If desired, a unique unit identifier such as the name, account number of bank card number etc. could be included as data within form data generated by the unit 106.

As shown in block 404, the unit 106 generates the digital signature transaction based embedded initiation data upon receipt of the first markup language data from unit 104 through proxy 108. As shown in block 405, the proxy 110 detects the initiation data in the header (data 119) from the application or unit 106. It then signs the accompanying data using its digital signature engine as shown in block 406. As shown in block 407, the proxy 110 then applies a data unit based digital signature to any data units making up the form data. Hence the proxy 110 initiates generation of transaction based digital signature for the markup data generated by the application or unit 106. The signature is added as an input field to the form. As such it is returned to the proxy when unit 104 submits the form to the receiving unit 106. The proxy 108 verifies the integrity of the data unit based signature and decrypts the data as shown in block 408. The proxy 108 signs the entire form document data including the signature that proxy 110 added. As shown in block 410, the proxy 108 detects the digital signature based initiation data. If desired, only the text based HTML data or form data is signed so no graphics are signed and stored. This may provide a verifiable record of what a user's browser received and displayed. The digital signature generated by proxy 108 is included as hidden input field data, as shown in blocks 412 and 414. This information is then passed to the application or unit 104. A user reviews the confirmation form data in their unit 104. If the user agrees with the presented information and wishes to complete the transaction, a user submits the form data to the proxy 108. The proxy 108 detects the signature in the header data and displays a dialog box notifying the user that they are about to submit signed data. The format of the dialog box may be any suitable form. As shown in block 415, proxy 108 encrypts and applies a data unit digital signature to signed data.

The proxy 110 decrypts and verifies the data unit digital signatures and the proxy 110 verifies the transaction signature data that previously was included in the information, as shown in block 416. A failure in the verification or comparison indicates a security error. This protects against the user or an intermediary either accidentally or maliciously modifying the data. The application 106 stores the digital signatures from the form data in memory 112, as shown in block 418. The application preserves the proxy generated transaction based digital signature by storing it in memory 112 to facilitate signature verification after completion of the data transfer between the units 104 and 106.

In sum, the above system employs proxies that are independent of browsers or other markup language interfaces, that apply persistent digital signatures to form data based on signature trigger detected header data. It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A digital signing method for data communicated between a first unit and a second unit through at least one proxy comprising:

detecting, by an independent proxy, digital signature initiation data embedded in data to be signed;

initiating, by the independent proxy, generation of a digital signature for the data in response to the independent proxy detected embedded digital signature initiation data, wherein the independent proxy includes a signature generator;

preserving the proxy generated digital signature to facilitate signature verification after completion of the data transfer between the first unit and the second unit;

applying by the independent proxy, at least a first data unit digital signature to a first data unit and applying the digital signature to transaction data wherein the transaction data includes at least some first data units;

applying, by a second independent proxy, at least a second data unit digital signature to a second data unit and applying at least another digital signature to transaction data wherein the transaction data includes at least some second data units; and verifying, by the independent proxy, that the digital signature originally applied by the independent proxy as received from the second protocol proxy is an acceptable digital signature.

2. The method of claim 1 including generating, by the first unit, the digital signature initiation data as part of data to be communicated to the second unit through the independent proxy.

3. The method of claim 1 including communicating the data with the digital signature initiation data from the first unit through a first independent proxy and wherein a second independent proxy receives the data with embedded digital signature initiation data and performs the initiating step to generate a digital signature corresponding to the second unit to facilitate non-repudiation of data received from the second unit.

4. The method of claim 3 including the step of generating, by the first independent proxy, a digital signature corresponding to the first unit.

5. The method of claim 3 including storing data received from the second unit and the digital signature corresponding to the second unit for verification.

6. The method of claim 1 including the steps of applying multiple data unit digital signatures to data associated with each data unit transfer session between the first and second units wherein multiple data unit transfer sessions correspond to a single transaction and wherein the data unit digital signatures are removed prior to joining data units into the transaction data.

7. The method of claim 1 wherein the independent proxy is a protocol proxy and interfaces with a plurality of software programs that support a mark-up language to facilitate secure communication of mark-up language based information.

8. The method of claim 1 including the step of interfacing, by the independent proxy, with a software program that supports a mark-up language and fails to include a digital signature engine and applying the digital signature to transaction data associated with the software program to facilitate secure communication of mark-up language based information.

9. The method of claim 1 including the step of interfacing each of the independent proxy and second independent proxy with at least one software program that supports a mark-up language to facilitate secure communication of mark-up language based information between the first and second proxies.

10. A digital signing-method for data communicated between a first unit and a second unit through at least two proxies comprising:

generating, by a first independent proxy in operative communication with the first unit, a data unit digital signature for first markup language data;

decrypting and verifying, by a second independent proxy in operative communication with the second unit, the data unit digital signature for the first markup language data;

generating digital signature transaction based embedded initiation data for second markup language data in response to the first markup language data;

initiating, by the second independent proxy, generation of a data unit digital signature for the second markup language data, wherein the second independent proxy includes a signature generator;

verifying, by the first independent proxy, an integrity of the data unit digital signature for the second markup language data;

detecting, by the first independent proxy, the digital signature transaction based initiation data for the second markup language data;

initiating, by the first independent proxy, generation of a transaction based first unit digital signature for the second markup language data in response to detecting the embedded digital signature transaction based initiation data, wherein the first independent proxy includes a signature generator;

adding the transaction based first unit digital signature as markup language tag data;

detecting, by the second independent proxy, the transaction based first unit digital signature and preserving the first independent proxy generated transaction based first unit digital signature to facilitate signature verification after completion of the data transfer between the first unit and the second unit.

11. The method of claim 10 including the step of interfacing, by the first independent proxy, with a software program that supports a mark-up language and fails to include a digital signature engine and applying the digital signature to transaction data associated with the software program to facilitate secure communication of mark-up language based information.

12. A digital signing apparatus for data communicated between a first unit and a second unit comprising:

a first independent proxy, operatively interposed between the first and second units; having:

a digital signature initiation data detector that detects embedded signature initiation data in data to be signed wherein the data is mark-up language data; and a digital signature generator, operatively coupled to the digital signature initiation data detector, wherein the first independent proxy initiates generation of a digital signature for the data in response to the independent proxy detected embedded digital signature initiation data as HTTP header tag data for an HTML form, wherein the independent proxy includes a signature generator; and memory, operatively responsive to the second unit, containing the proxy generated digital signature to facilitate signature verification after completion of the data transfer between the first unit and the second unit.

13. The apparatus of claim 12 including a digital signature initiation data generator responsive to digital signature request data.

14. The apparatus of claim 12 including communicating the data with the digital signature initiation data from the first unit through a first independent proxy and wherein a second independent proxy receives the data with embedded digital signature initiation data and performs the initiating step to generate a digital signature corresponding to the second unit to facilitate non-repudiation of data received from the second unit.

15. The apparatus of claim 12 including a second independent proxy having a digital signature generator wherein the first and second proxies apply multiple data unit digital signatures to data associated with each data unit transfer session between the first and second units wherein multiple sessions correspond to a single transaction and wherein the data unit digital signatures are removed prior to joining data units into the transaction data.

16. The apparatus of claim 15 wherein:

the first independent proxy applies at least a first data unit digital signature to a first data unit and applies the digital signature to transaction data wherein the transaction data includes at least some first data units;

the second independent proxy applies at least a second data unit digital signature to a second data unit and applies at least another digital signature to transaction data wherein the transaction data includes at least some second data units; and a signature verifier adapted to verify that the digital signature originally applied by the first independent proxy as received from the second protocol proxy is an acceptable digital signature.

17. The apparatus of claim 12 wherein the first independent proxy is a protocol proxy and interfaces with a plurality of software programs that support a mark-up language to facilitate secure communication of mark-up language based information.

18. The apparatus of claim 12 wherein the first independent proxy interfaces with a software program that supports a mark-up language and fails to include a digital signature engine and applies the digital signature to transaction data associated with the software program to facilitate secure communication of mark-up language based information.

19. The apparatus of claim 12 wherein the data is markup language data and including generating the digital signature initiation data as HTTP header tag data for an HTML form.

20. A digital signing apparatus for data communicated between a first unit and a second unit comprising:

a first independent proxy, operatively interposed between the first and second units, having:
   a digital signature initiation data detector that detects embedded signature initiation data in data to be signed; and
   a digital signature generator, operatively coupled to the digital signature initiation data detector, wherein the first independent proxy initiates generation of a digital signature for the data in response to the independent proxy detected embedded digital signature initiation data, wherein the independent proxy includes a signature generator;

memory, operatively responsive to the second unit, containing the proxy generated digital signature to facilitate signature verification after completion of the data transfer between the first unit and the second unit; and the first independent proxy applies at least a first data unit digital signature to a first data unit and applies the digital signature to transaction data wherein the transaction data includes at least some first data units;

the second independent proxy applies at least a second data unit digital signature to a second data unit and applies at least another digital signature to transaction data wherein the transaction data includes at least some second data units; and a signature verifier adapted to verify that the digital signature originally applied by the first independent proxy as received from the second protocol proxy is an acceptable digital signature.

21. The apparatus of claim 20 wherein the first and second independent proxy each interface with at least one software program that supports a mark-up language to facilitate secure communication of mark-up language based information between the first and second proxies.

22. A digital signing method for data communicated between a first unit and a second unit through at least one proxy comprising:

detecting, by an independent proxy, digital signature initiation data embedded in data to be signed;

initiating, by the independent proxy, generation of a digital signature for the data in response to the independent proxy detected embedded digital signature initiation data, wherein the independent proxy includes a signature generator; and preserving the proxy generated digital signature to facilitate signature verification after completion of the data transfer between the first unit and the second unit; wherein the data is markup language data and including generating the digital signature initiation data as HTTP header tag data fro an HTML form.

* * * * *